(12) United States Patent
Takerian et al.

(10) Patent No.: US 7,280,972 B1
(45) Date of Patent: Oct. 9, 2007

(54) SEAT LOCK OUT ASSEMBLY AND METHOD OF USE

(76) Inventors: Jack H. Takerian, 8605 River Terrace Dr., Franklin, WI (US) 53132; Daniel G. Radler, 20765 Bartlett Ct., Brookfield, WI (US) 53045

( * ) Notice: Subject to any disclaimer, the term of this patent is extended or adjusted under 35 U.S.C. 154(b) by 1091 days.

(21) Appl. No.: 10/407,656

(22) Filed: Apr. 4, 2003

Related U.S. Application Data

(63) Continuation-in-part of application No. 09/799,175, filed on Mar. 5, 2001, now Pat. No. 6,578,395.

(51) Int. Cl.
*G06Q 99/00* (2006.01)

(52) U.S. Cl. ............................................. 705/1; 70/261

(58) Field of Classification Search ..................... 705/1
See application file for complete search history.

(56) References Cited

U.S. PATENT DOCUMENTS

| | | | |
|---|---|---|---|
| 1,421,726 A | 7/1922 | Saunders | |
| 3,348,391 A | 10/1967 | Barnwell | |
| 4,103,524 A | 8/1978 | Mitchell et al. | |
| 4,458,738 A | 7/1984 | Wilson | |
| 4,475,366 A | 10/1984 | Marneris | |
| 5,028,086 A | 7/1991 | Smith | |
| 5,251,465 A | 10/1993 | Hwang | |
| 5,271,636 A | 12/1993 | Mohrman et al. | |
| 5,277,043 A | 1/1994 | Inashvili | |
| 5,460,021 A | 10/1995 | Taylor | |
| 5,686,765 A * | 11/1997 | Washington | ............... 307/10.5 |
| 5,719,555 A * | 2/1998 | Zeytoonjian et al. | ....... 340/571 |
| 5,737,949 A | 4/1998 | Zenke | |
| 5,964,109 A | 10/1999 | Zenke | |
| 6,169,650 B1 * | 1/2001 | Albrecht | ..................... 361/171 |

\* cited by examiner

*Primary Examiner*—John G. Weiss
*Assistant Examiner*—Michael Fisher
(74) *Attorney, Agent, or Firm*—Quarles & Brady LLP

(57) ABSTRACT

A method for enhancing income when renting a vehicle having a driver seat and at least one passenger seat, wherein a driver sits in the driver seat to operate the vehicle, includes renting the vehicle to a user for a predetermined number of occupants of the vehicle including a driver, wherein, the predetermined number of occupants including the driver is less than the number of seats in the vehicle. Locking out a number of seats in the vehicle that is in excess of the predetermined number of occupants including the driver. Releasing the vehicle to the user for authorized use of the vehicle having occupants in the driver seat and any unlocked passenger seats. In one embodiment, locking out a number of passenger seats includes fixing a seat lock-out assembly across a body support of at least one of said number of passenger seats to discourage unauthorized use of said at least one passenger seat.

4 Claims, 4 Drawing Sheets

SEAT LOCK OUT ASSEMBLY AND METHOD OF USE

CROSS REFERENCES TO RELATED APPLICATIONS

This application is a continuation of U.S. patent application Ser. No. 09/799,175 filed on Mar. 5, 2001 now U.S. Pat. No. 6,578,395.

STATEMENT REGARDING FEDERALLY SPONSORED RESEARCH

Not Applicable

BACKGROUND OF THE INVENTION

The present invention relates to lock out assemblies, and more particularly to seat lock-out assemblies which discourage the use of a seat in a vehicle, such as a golf cart, by an unauthorized user.

Vehicles are often provided for particular uses by the vehicle owner. The vehicle owner collects a fee for such use, and an unauthorized use results in a loss of the fee. For example, golf carts are rented to golfers for use on a golf course. The fee charged for use of the golf cart can depend upon the number of golfers using the cart. Often the cart is provided with two seats. If an individual golfer rents the cart, and does not disclose that two golfers will be using the cart, the owner loses the additional fee for the additional golfer.

Prior art locks for use on a vehicle are directed at preventing the theft of the vehicle, and do not prevent the unauthorized use of individual vehicle seats. For example, U.S. Pat. No. 4,103,524 discloses a steering wheel lock which prevent the unauthorized use of the vehicle. Unfortunately, the disclosed steering wheel lock does not prevent unauthorized use of the vehicle passenger seats when use of the vehicle by a single user is authorized.

A security device for use with golf carts is disclosed in U.S. Pat. No. 5,460,021 which prevents unauthorized access to a golf cart battery and locks the steering wheel. The device requires engagement of the steering wheel, and does not prevent unauthorized use of a passenger seat if limited use of the cart is authorized. Therefore a need exists for a mechanism and method which discourages the use of seats on a vehicle for which an additional fee has not been paid or use has not been authorized.

SUMMARY OF THE INVENTION

The present invention provides a method and apparatus for enhancing income when renting a vehicle having a driver seat and at least one passenger seat, wherein a driver sits in the driver seat to operate the vehicle, includes renting the vehicle to a user for a predetermined number of occupants of the vehicle including a driver, wherein, the predetermined number of occupants including the driver is less than the number of seats in the vehicle. Locking out a number of seats in the vehicle that is in excess of the predetermined number of occupants including the driver. Releasing the vehicle to the user for authorized use of the vehicle having occupants in the driver seat and any unlocked passenger seats.

In one embodiment of the present invention, locking out a number of passenger seats includes fixing a seat lock-out assembly across a body support of at least one of the passenger seats to discourage unauthorized use of said at least one passenger seat.

In another embodiment, the seat lock out assembly includes an elongated member and a shield fixed to the elongated member. The elongated member is fixed across the body support of the passenger seat being locked out.

A general objective of the present invention to provide a method and apparatus for enhancing income when renting a vehicle having a driver seat and at least one passenger seat. This objective is accomplished by locking out the number of passenger seats in the vehicle that is in excess of the predetermined number of occupants including the driver to prevent unauthorized use The foregoing and other objectives and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
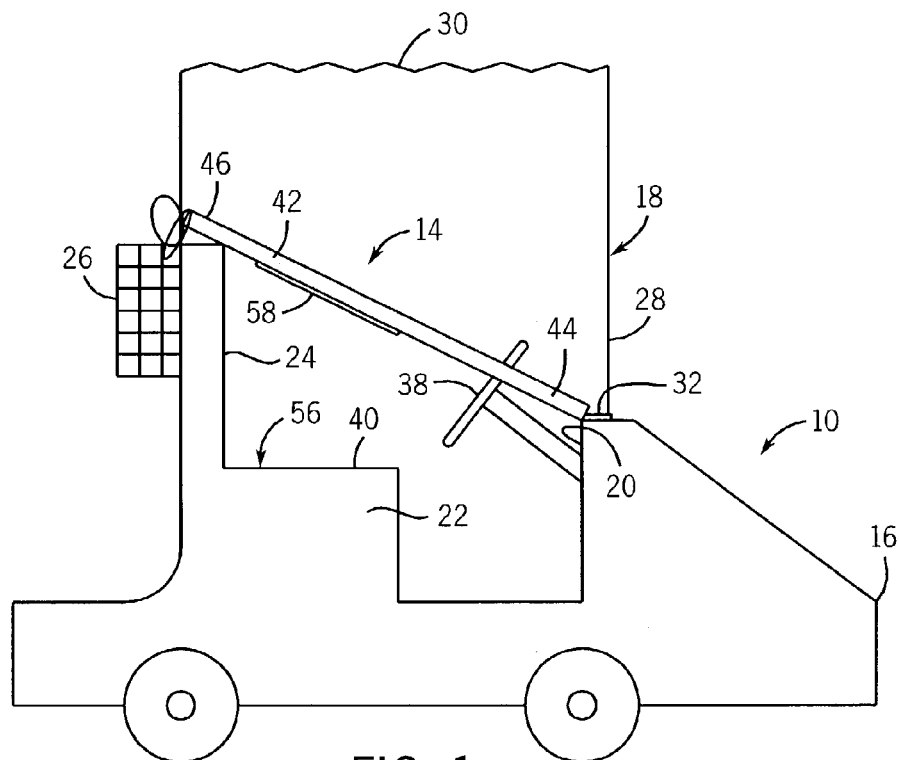
FIG. 1 is a side view of a vehicle incorporating the present invention.
Figure 2:
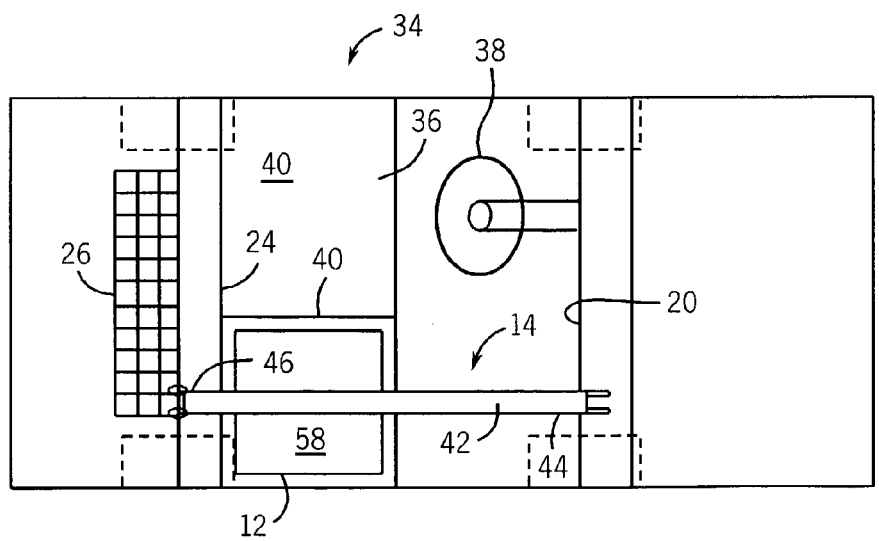
FIG. 2 is a top view of the vehicle of FIG. 1.
Figure 3:
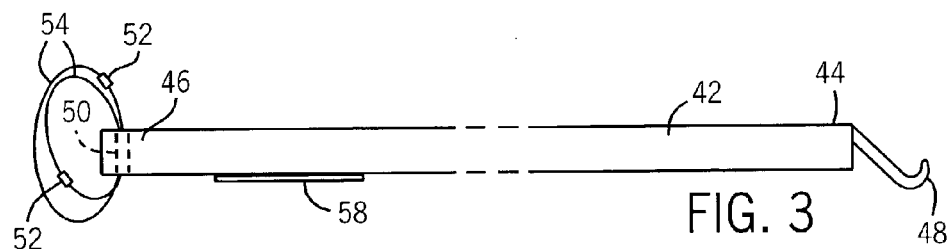
FIG. 3 is a side view of the seat lock-out assembly of FIG. 1.
Figure 4:
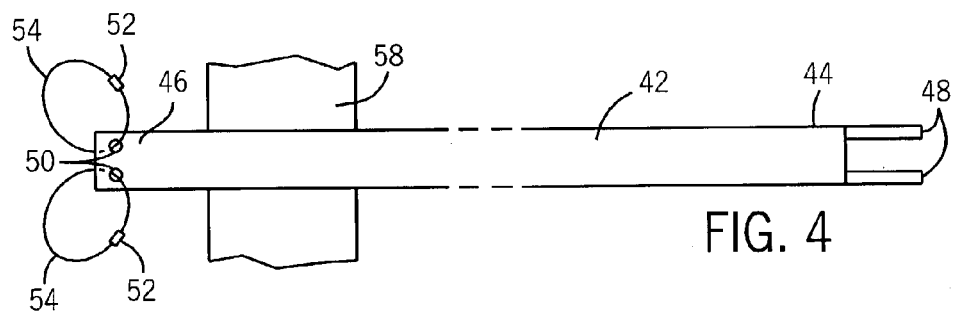
FIG. 4 is a top view of the seat lock-out assembly of FIG. 3.

As shown in FIGS. 1 and 2, a vehicle 10, such as a golf cart, automobile, truck, and the like, includes a chassis 16, a passenger seat 12 fixed to the chassis. A seat lock-out assembly 14 is fixed to the chassis and disposed over the passenger seat 12. The seat lock-out assembly 14 discourages unauthorized use of the locked out seat 12.

The vehicle chassis 16 includes vehicle members, such as canopy supports 18, a dashboard 20, a seat support 22, a back rest 24, a basket 26, and the like, all of which are adjacent to the seat 12. The canopy supports 18 include upright supports 28 which support a canopy 30, and a transverse support 32 which extends between the upright supports 28 to increase the rigidity of the canopy assembly. The basket 26 is fixed to the back rest 24, and a portion of the basket 26 extends above the back rest 24.

The vehicle includes a bench 34 having a driver seat 36 and the passenger seat 12. The driver seat 36 is disposed rearwardly of a steering wheel 38 for operating the vehicle 10. The passenger seat 12 is next to the driver seat 36. Both the driver and passenger seats 12, 36 include a body support 40 upon which a user sits. The body support 40 can be an integral part of the chassis 16, and supports the user's body when using the respective seat 12, 36. Although only two seats are shown, the vehicle can include additional passenger seats without departing from the scope of the invention.

Although the following description is directed at locking out the passenger seat 12, it is understood that any seat 12, 36 in the vehicle can be locked out as described below.

The seat lock-out assembly 14 is fixed to the vehicle chassis 16, and extends over at least one of the seat body supports 40 to discourage the unauthorized use of the seat 12. In the embodiment shown in FIGS. 1-4, the seat lock-out assembly 14 is detachable from the chassis 16 when use of the seat 12 is authorized. Advantageously, the detachable seat lock-out assembly 14 can be used with a second vehicle when use of all of the seats 12, 36 on the first vehicle 10 are authorized.

As shown in FIGS. 1-4, the seat lock-out assembly 14 includes an elongated bar 42 having first and second ends 44, 46. The first end 44 includes axially extending hooks 48 which hook around the canopy transverse support 32. The elongated bar 42 is not parallel to the body support top surface 56 to discourage an unauthorized user from attempting to sit on the seat lock-out assembly 14. Apertures 50 formed in the second end 46 receive a cable 54 which secures the second end 46 to the vehicle 10.

The cable 54 includes a lock 52 which prevents disengagement of the elongated bar second end 46 from the vehicle 10. Preferably, the cable is intertwined with the basket 26 to fix the second end 46 to the vehicle 10. Although engaging the basket 26 and transverse canopy support 32 with the elongated bar ends 44, 46 is shown, the ends 44, 46 of the elongated bar 42 can be fixed to any part of the chassis 16, such as beneath the body support 40 and above the back rest 24, to position the seat lock-out assembly 14 over the seat body support 40 without departing from the scope of the invention.

A shield 58 is fixed to the elongated bar 42, such as by welding, bolting, gluing, and the like, and covers at least a portion of the seat body support 40. The shield 58 covers at least a portion of the upwardly facing surface area of the body support 40, and renders sitting on the body support 40 difficult for an unauthorized user.

In use, the cable 54 is fixed to the basket 26 behind the seat 12 being locked out, and the hooks 48 on the first end 44 of the seat lock-out assembly elongated bar 42 are engaged with the transverse canopy support 32 forward of the seat 12. The cable lock 52 is then locked to prevent removal of the seat lock-out assembly 14.

When not in use, the lock 52 is unlocked, and the cable 54 is slipped out of the apertures 50, and the hooks 48 are disengaged from the transverse canopy support 32. The cable 54 can remain intertwined with the basket 26 without interfering with the use of the previously locked out seat 12, or can be removed for use on a different vehicle.

Figure 5:
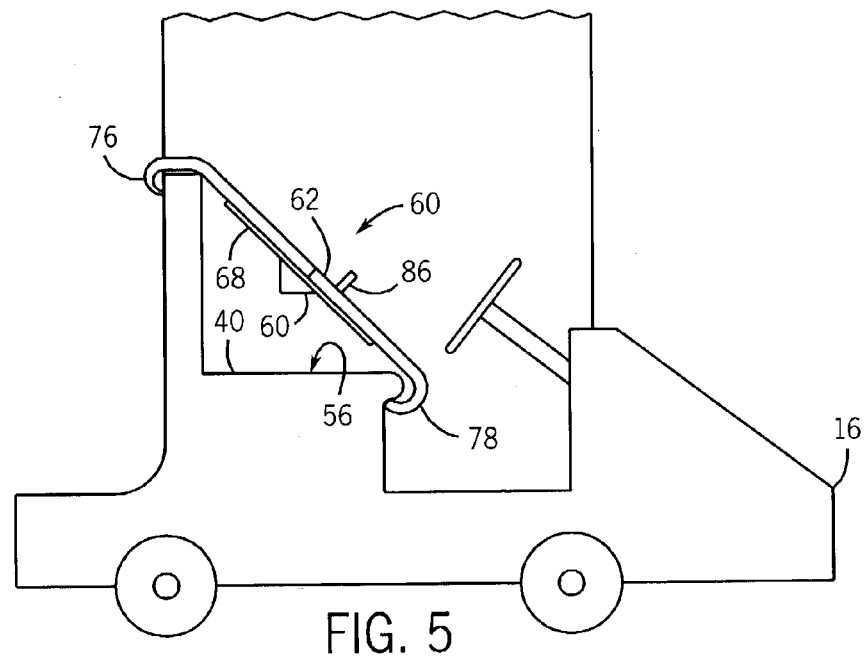
FIG. 5 is a side view of second embodiment of the present invention.
Figure 6:
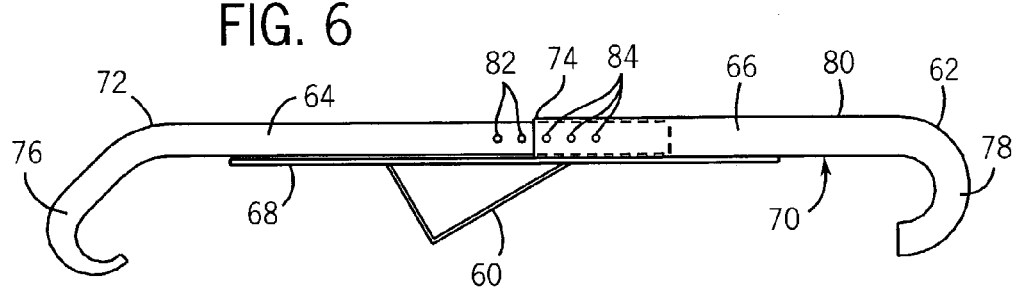
FIG. 6 is a side view of the set lock-out assembly of FIG. 5.
Figure 7:
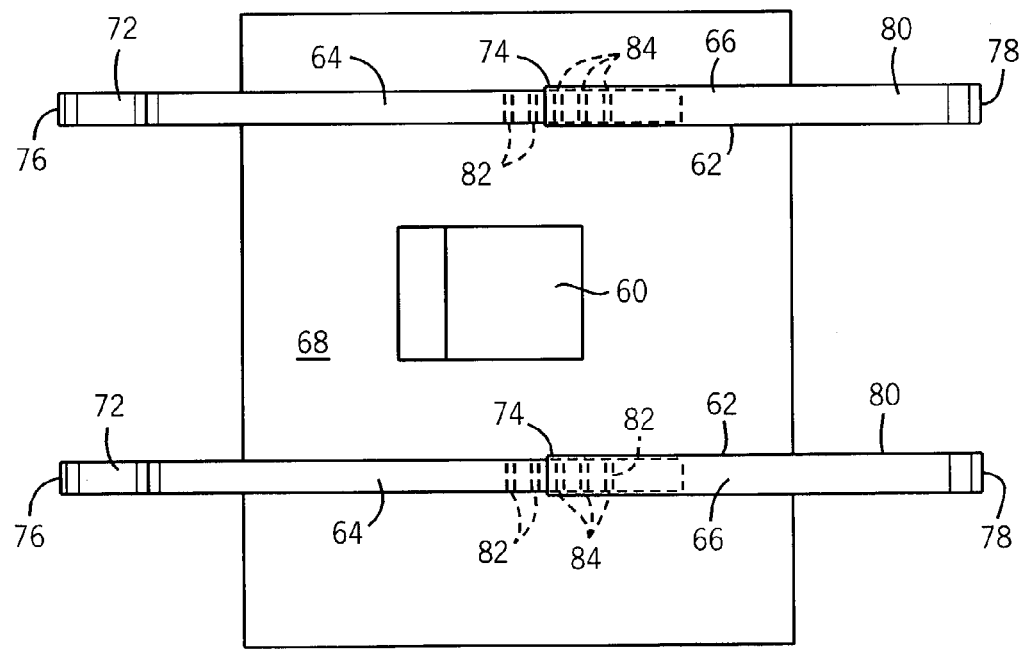
FIG. 7 is a top view of the seat lock-out assembly of FIG. 6

In a second embodiment of the present invention shown in FIGS. 5-7, a seat lock-out assembly 60 includes two elongated bars 62. Each bar 62 has an inner tube 64 in a slidable telescoping relation with an outer tube 66. Although tubes are disclosed, any shaped member, such as a channel can be used without departing from the scope of the invention.

Each seat lock-out assembly elongated bar 62 extends across the seat body support 40, as in the first embodiment, to discourage unauthorized use of the seat 12. The elongated bars 62 are fixed relative to each other by a shield 68 fixed to the outer surface 70 of the outer tube 66. Although fixing the elongated bars 62 relative to each other with the shield 68 is disclosed, a separate cross member can be used without departing from the scope of the invention.

The inner tube 64 has an outer end 72 extending out of one end 74 of the outer tube 66. A hook 76 formed on the inner tube outer end 72 engages the vehicle chassis 16. Another hook 78 formed on the other end 80 of the outer tube 66 also engages the vehicle chassis 16.

Radial through holes 82, 84 are formed in the inner and outer tubes 64, 66. Through holes 82, 84 are holes which extend through the tubes 64, 66. When the hooks 76, 78 at the tube ends 72, 78 are engaged with the vehicle chassis 16, a through hole 82 in the inner tube 64 is aligned with a through hole 84 in the outer tube 66. A pin or lock hasp 86 is inserted through the aligned holes 82, 84 to prevent slidable relative movement of the tubes 64, 66, and thus disengagement of the hooks 76, 78 from the vehicle chassis 16.

As shown in FIGS. 5-7, the shield 68 includes a horizontal surface 60 for use as a shelf, cup holder, and the like, by the authorized user of the vehicle. By providing a horizontal surface 60 in a portion of the shield 68, a substantial portion of the shield 68 can remain at an angle to the body support top surface 56 to discourage unauthorized use of the seat 12.

Figure 8:
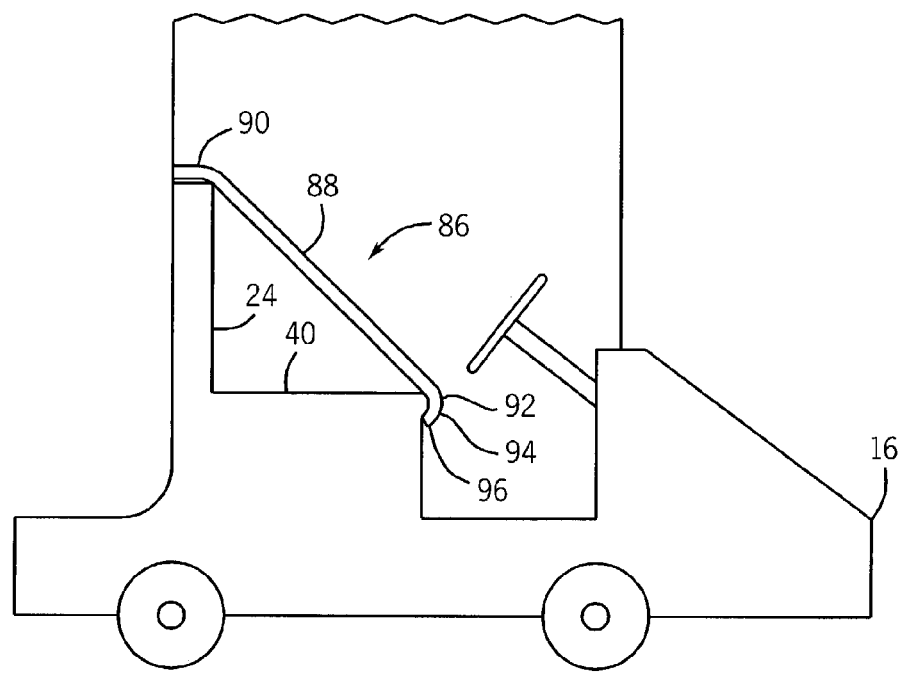
FIG. 8 is a side view of a third embodiment of the present invention.

In a third embodiment shown in FIG. 8, the seat lock-out assembly 86 is a shield 88 pivotally fixed to the chassis 16, such as by hingedly mounting one end 90 of the shield to the chassis 16. The opposing end 92 of the shield 88 includes a latch 94 which engages a lockable catch 96 fixed to the chassis 16. the latch 94 and catch 96 can be commercially available hardware, such as for use with a building door. The shield 88 is pivoted over the body support 40, and locked in place. The shield 88 can be pivotally fixed to the back rest 24 above the body support 40, such as shown in FIG. 8, and can be formed as part of the backrest 24 which pivots forwardly over the body support 40 without departing from the scope of the invention.

Figure 9:
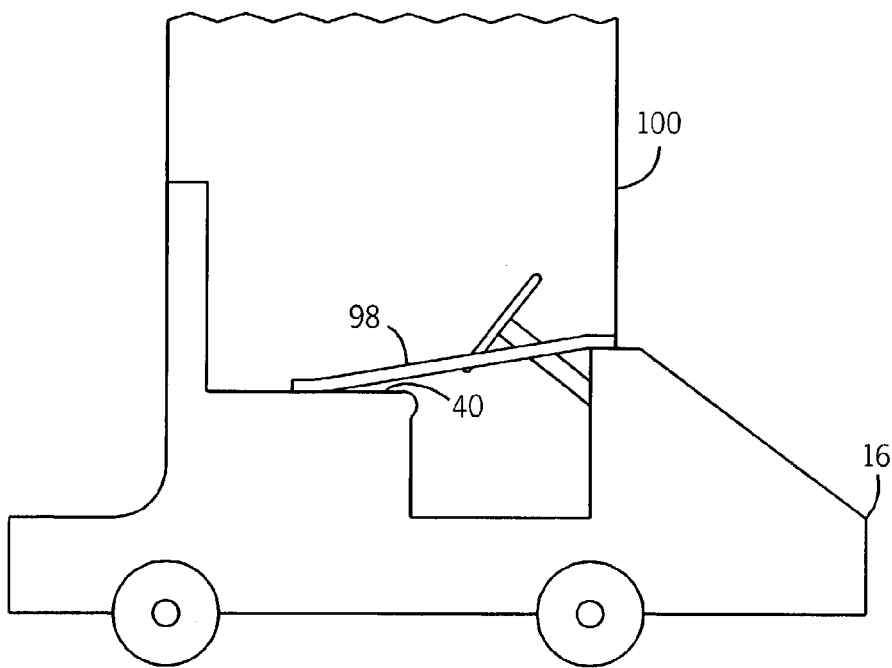
FIG. 9 is a side view of a fourth embodiment of the present invention.

In a fourth embodiment shown in FIG. 9, a shield 98 is formed s part of a windshield 100 disposed forward of the seat 12. The shield 98 is pivotally mounted to the chassis 16, as in the third embodiment, and pivots rearwardly to cover the body.

Advantageously, any of the above described seat lock-out assemblies can be used to prevent unauthorized use of a passenger seat in a vehicle to enhance income when renting a vehicle having a driver seat and at least one passenger seat, wherein a driver sits in the driver seat to operate the vehicle. In particular, unauthorized use of a vehicle can be prevented by 1) renting the vehicle to a user for a predetermined number of occupants of the vehicle including a driver, wherein, the predetermined number of occupants including the driver is less than the number of seats in the vehicle; 2) locking out a number of passenger seats in the vehicle that is in excess of the predetermined number of occupants including the driver; and 3) releasing the vehicle to the user for authorized use of the vehicle having occupants in the driver seat and any unlocked passenger seats. Of course, if the vehicle contains more than one passenger seat, and the user is willing to pay a fee for use of one or more of the passenger seats, only the excess passenger seats are locked out to prevent unauthorized use of the excess passenger seats.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

We claim:

1. A method for enhancing income when renting a vehicle having a driver seat and at least one passenger seat, wherein a driver sits in the driver seat to operate the vehicle, said method comprising:

renting the vehicle to a user for a predetermined number of occupants of the vehicle including a driver, wherein, the predetermined number of occupants including the driver is less than the number of seats in the vehicle;

locking out a number of seats in the vehicle that is in excess of the predetermined number of occupants including the driver; and releasing the vehicle to the user for authorized use of the vehicle having occupants in the driver seat and any unlocked passenger seats.

2. The method as in claim 1, in which locking out a number of passenger seats include fixing a seat lock-out assembly across a body support of at least one of said number of passenger seats to discourage unauthorized use of said at least one passenger seat.

3. The method as in claim 2, in which said seat lock-out assembly includes a shield extending over the body support.

4. The method as in claim 1, in which said vehicle is a golf cart.

* * * * *